United States Patent [19]
Schaffer

[11] 3,774,177
[45] Nov. 20, 1973

[54] NONVOLATILE RANDOM ACCESS MEMORY CELL USING AN ALTERABLE THRESHOLD FIELD EFFECT WRITE TRANSISTOR

[75] Inventor: Albert M. Schaffer, Dayton, Ohio

[73] Assignee: The National Cash Register Company, Dayton, Ohio

[22] Filed: Oct. 16, 1972

[21] Appl. No.: 297,962

[52] U.S. Cl. .............. 340/173 R, 307/238, 307/246
[51] Int. Cl. ........................ G11c 11/24, G11c 11/40
[58] Field of Search ................. 340/173 R, 173 CA; 307/238, 246, 304, 279

[56] References Cited

UNITED STATES PATENTS

| | | | |
|---|---|---|---|
| 3,508,211 | 4/1970 | Wegener | 340/173 R |
| 3,706,079 | 12/1972 | Vadasz | 340/173 CA |
| 3,718,915 | 2/1973 | Lattin | 340/173 CA |

OTHER PUBLICATIONS

Abaof, Thin Films Based on $Al_2O_3$, IBM Technical Disclosure Bulletin, Vol. 12 No. 11, 4/70, p. 1836
Balk, Making Multilayer IGFET, IBM Technical Disclosure Bulletin, Vol. 12 No. 11, 4/70, p. 1858

*Primary Examiner*—Vincent P. Canney
*Assistant Examiner*—Stuart Hecker
*Attorney*—J. T. Cavender et al.

[57] ABSTRACT

The present invention relates to a nonvolatile random access memory cell having a fixed threshold field effect read transistor, a fixed threshold field effect storage transistor and an alterable threshold field effect write transistor in it. The source electrode of the read transistor is connected to the drain electrode of the storage transistor to sense when the latter transistor is holding a volatile charge on its gate electrode, and the gate electrode of the read transistor and the gate electrode of the write transistor are connected together to consolidate read and write select lines. The drain electrodes of the read transistor and the write transistor are connected together to consolidate read and write lines. The source electrode of the write transistor and the gate electrode of the read transistor are connected together to allow for storage of information on the gate electrode of the latter transistor through the former transistor and to allow for nonvolatile storage into the former transistor of the volatile information in the latter transistor by channel shielding as power is lost to the cell. Storage means is connected to the gate electrode of the write transistor to non-volatilely store the volatile information which is held as a charge or no charge on the gate electrode of the storage transistor, as power is removed from the nonvolatile random access memory cell.

13 Claims, 3 Drawing Figures

NONVOLATILE RANDOM ACCESS MEMORY CELL USING AN ALTERABLE THRESHOLD FIELD EFFECT WRITE TRANSISTOR

BACKGROUND OF THE INVENTION

At the 1972 IEEE International Solid State Conference and in its session abstracts at pages 10 and 11, J. A. Karp et al. discloses a volatile random access memory cell which has three fixed threshold transistors in it. Information is volatilely held within a fixed threshold field effect storage transistor while power is applied to the random access memory cell. However, as power is lost to the random access memory cell, the information is lost from the fixed threshold field effect storage transistor. The write transistor of the cell has a fixed threshold.

The nonvolatile random access memory cell of the present invention has an alterable threshold field effect write transistor rather than a fixed threshold field effect write transistor as used in the cell of the above prior art reference. Information which is volatilely held on the gate electrode of the storage transistor is nonvolatilely stored in the write transistor as one of two possible threshold voltages of the write transistor, as power is lost to the nonvolatile random access memory cell, by pulsing the gate electrode of the alterable threshold field effect write transistor with a storage voltage.

SUMMARY OF THE INVENTION

The present invention relates to a nonvolatile random access memory cell having an alterable threshold field effect write transistor, a fixed threshold field effect storage transistor and a fixed threshold field effect read transistor. The source electrode of the write transistor is connected to the gate electrode of the storage transistor to allow binary information to be stored as a "charge" or "no charge" on the gate electrode. The source electrode of the read transistor is connected to the drain electrode of the storage transistor for reading the state of the volatile binary information which exists on the gate electrode of the storage transistor, prior to power being removed from the nonvolatile memory cell. The source electrode of the write transistor is further connected to the gate electrode of the storage transistor to allow for the nonvolatile storage of the state of the binary information on the gate electrode of the storage transistor in the write transistor, as power is removed from the nonvolatile memory cell.

An object of the present invention is to provide a nonvolatile random access memory cell which volatilely holds binary information therein when power is applied to it and which will nonvolatilely store binary information when power is removed from it.

Another object of the present invention is to provide an array of nonvolatile random access memory cells, any one of which may be selectively volatilely written into, volatilely read or have its information nonvolatilely stored.

DESCRIPTION OF THE PREFERRED EMBODIMENT

Figure 1:
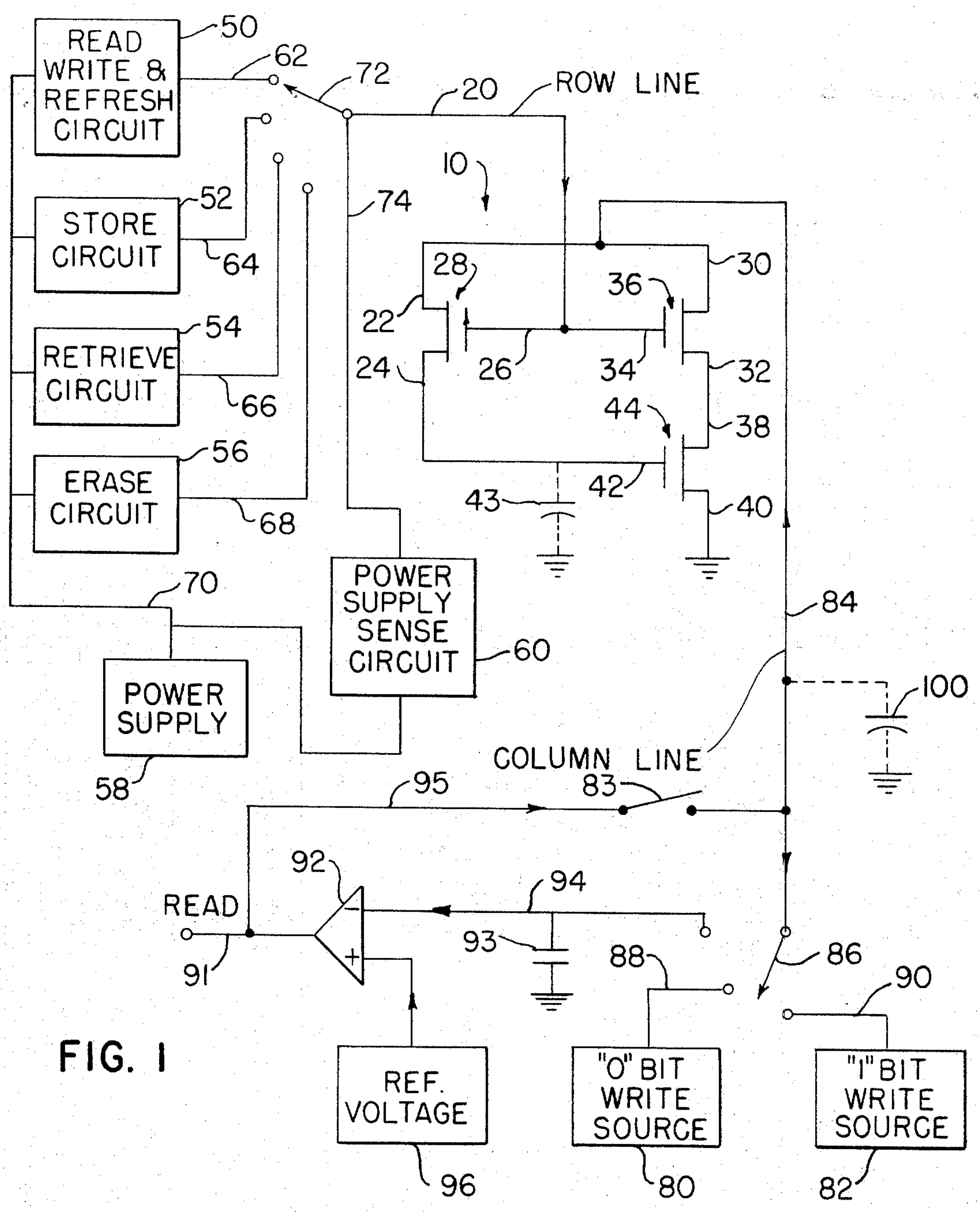
FIG. 1 is a schematic diagram of a memory circuit associated with nonvolatile random access memory cell.

FIG. 1 shows a fixed threshold field effect read transistor 36, a fixed threshold field effect storage transistor 44 and an alterable threshold field effect write transistor 28 connected to form a nonvolatile random access memory cell 10. The alterable threshold write transistor 28 may, by way of example, by a p-channel enhancement mode metal-silicon nitride-silicon dioxide-silicon (MNOS) transistor or a metal-aluminum oxide-silicon oxide-silicon (MAOS) transistor. The fixed threshold transistors 36 and 44 may be p-channel enhancement mode metal-silicon dioxide-silicon (MOS) transistors. The source electrode 32 of read transistor 36 is connected to the drain electrode 38 of storage transistor 44 in order to determine whether storage transistor 44 conducts when transistor 36 is made conductive. If storage transistor 44 conducts, it is volatilely holding a one bit in it. If storage transistor 44 does not conduct, it is volatilely holding a zero bit in it. Gate electrode 34 of read transistor 36 is connected to gate electrode 26 of write transistor 28 in order that both of these transistors will turn on when a voltage is applied to a row line 20. Source electrode 24 of write transistor 28 is connected to the gate electrode 42 of storage transistor 44 in order to volatilely store a charge on gate electrode 42. This charge is used to shield the channel region of write transistor 28, when a store voltage is placed on gate electrode 26 as power is being lost to cell 10. A one bit is thus nonvolatilely stored in write transistor 28. Capacitor 43, shown connected to gate electrode 42 of storage transistor 44 may, in reality, be the gate-to-substrate capacitance of transistor 44. A read-write column line 84 is connected to both drain electrode 22, write transistor 28 and drain electrode 30 of read transistor 36 to allow for reading, for volatile writing and for refreshing of binary data in storage transistor 44. The row line 20 is connected to gate electrodes 26 and 34 to allow for the reading or the writing of cell 10 and also for the nonvolatile storage, retrieval and erasure of data at write transistor 28. A switch 72, which is connected to row line 20, is selectively placed in contact with read and write circuit 50, store circuit 52, retrieve circuit 54 or erase circuit 56 to read or volatilely write cell 10, or to nonvolatilely store, retrieve or erase data at write transistor 28. The output of power supply 58 is connected to circuits 50, 52, 54 and 56, via line 70, to provide the appropriate operating potentials thereto. Power supply sense circuit 60 activates switch 72 so as to be in contact with circuits 50, 52, 54 or 56. Switch 72 is placed in contact with store circuit 52 as power is lost due to the failure of power supply 58, to allow for the nonvolatile storage of the volatile data of storage transistor 44 in write transistor 28. 0 bit write source 80 and 1 bit write source 82 are connectable to column line 84 via switch 86 depending on whether a 0 or a 1 bit of binary information is to be writeen into the random access memory cell 10. Switch 86 is also connectable, through line 94, to differential amplifier 92 to read the state of the bit of binary information volatilely stored in cell 10 and to refresh this binary information after it is read. This is done by closing switch 83. The output of the differential amplifier 92 is connected back to column line 84 by means of lead 95 and switch 83, to allow for the output to refresh a negative voltage level on gate electrode 42 of storage transistor 44. A reference voltage 96 is connected to differential amplifier 92 to allow amplifier 92 to determine whether the gate electrode of transistor 44 is charged or not and thus read the binary state of transistor 44 through read out line 91 of refresh the charge on gate electrode 42. Capacitor 100 is connected between ground potential and column line 84 in order to hold a binary charge bit prior to a turn-on time of transistors 28 and 36, at which turn-on time the binary charge bit is volatilely written into transistor 44.

The read, write and refresh circuit 50 is used to turn on field effect transistors 28 and 36 at the time of volatile writing of binary information into transistor 44. 0 bit write source 80 and 1 bit write source 82 are used to place a 0 bit binary charge or a 1 bit binary charge on gate electrode 42 during a normal volatile write operation. Differential amplifier 92 is used to read the information volatilely stored in storage transistor 44 of the nonvolatile random access memory cell 10 or to refresh the information volatilely stored in storage transistor 44 of the nonvolatile random access memory cell 10.

Store circuit 52 is used to pulse gate electrode 26 of the alterable threshold field effect write transistor 28 with a large negative storage voltage to nonvolatilely store the volatile information of transistor 44 into transistor 28 during the loss of power to cell 10. Capacitor 100 is charged to −12 volts prior to the store operation. Power supply sense circuit 60 is used to sense for the loss of power from power supply 58 to initiate the nonvolatile storage operation in nonvolatile random access memory cell 10. If a 1 bit binary charge is on gate electrode 42 during a nonvolatile storage operation, the threshold voltage of write transistor 28 will not be changed, due to the fact that the channel of write transistor 28 is shielded by this 1 bit binary charge at the source electrode 24 from the gate electrode 42. If, on the other hand, an uncharged 0 bit exists on gate electrode 42 of storage transistor 44, the threshold voltage of write transistor 28 is changed from about −2 volts to about −10 volts during a nonvolatile storage operation.

Retrieve circuit 54 is used to apply an intermediate voltage, between the two possible threshold voltages of the alterable field effect write transistor 28, and thus allows the binary information, nonvolatilely stored in cell 10 to be retrieved as volatile information, back into storage transistor 44 of memory cell 10. Retrieve circuit 54 is used in conjunction with capacitor 100 to either charge or not charge gate electrode 42, depending on the threshold voltage of write transistor 28, during the retrieval operation. Capacitor 100 is first charged and an intermediate retrieval voltage is then placed on gate electrode 26 to either charge or not charge gate electrode 42 depending on the threshold voltage of write transistor 28.

Erase circuit 56 is used to set the threshold voltage of field effect write transistor 28 to −2 volts after a retrieval operation has occurred. Erase circuit 56 places a large positive voltage on gate electrode 26 to thus reset the threshold voltage of write transistor 28 to its normal operating condition.

Figure 2:
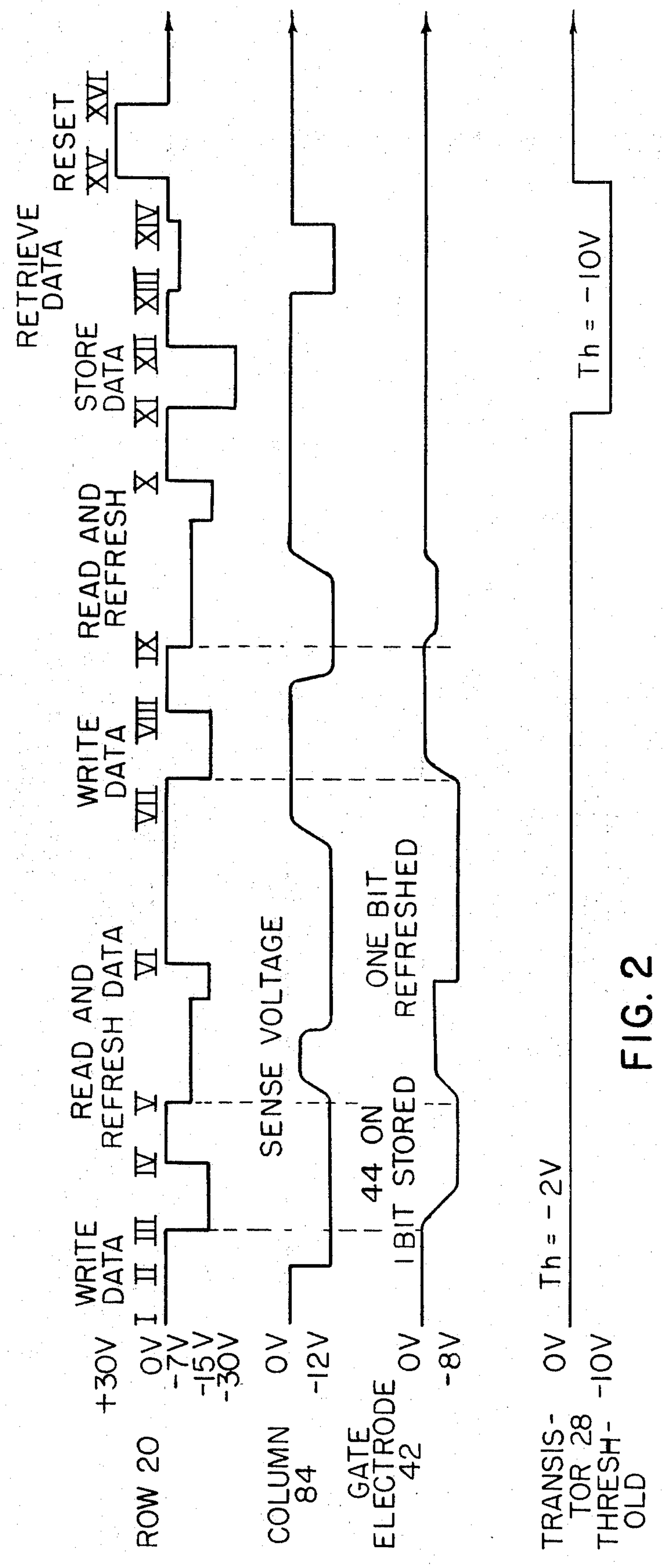
FIG. 2 is a timing diagram for the memory circuit of FIG. 1.

A timing diagram of the nonvolatile random access memory cell 10 of FIG. 1 is shown in FIG. 2. At a time I, the alterable threshold write transistor 28 exists at a threshold voltage of −2 volts. The write transistor 28 is then in the erased condition and negative charge is stored in its gate insulator layers. At time II, a 1 binary bit of charge is placed in capacitor 100, as part of a write operation, by placing switch 86 in contact with 1 bit write source 82. At time III, a −15 volt write voltage is applied to row line 20 and capacitor 100 is partially discharged since write transistor 28 is on. Charge is thus placed on gate electrode 42 to change the voltage potential of gate electrode 42 from zero volts to −8 volts. At time IV, the write voltage is removed from row line 20. The length of time for the write operation is about 30 nanoseconds. Between times IV and V, switch 86 is again placed in contact with 1 bit write source 82 to charge capacitor 100. Switch 86 is then opened. This charging is used to read the state of cell 10.

A time V, a read and refresh operation occurs. Switch 72 is placed in contact with circuit 50 to provide a −6 volt gate voltage on gate electrodes 26 and 34 and switch 86 is placed in contact with line 94. Since field effect transistor 44 is on, line 94 will be at about −3 volts and capacitor 100 will be partially discharged. A −12 volt, representing a 1 bit, will come out of differential amplifier 92 over line 91 since one of its input terminals is at a reference voltage of about −8 volts and the other input terminal is at about −3 volts. The information is read over line 91 as a negative output voltage or 1 bit. Switch 86 is then opened and switch 83 is closed to bring line 84 to a voltage of about −12 volts and row line 20 is then driven to about −15 volts to negatively charge gate electrode 42 to −8 volts. The one bit of data has therefore been refreshed within memory cell 10. Switches 72, 86 and 83 are then opened.

At time VII another write operation occurs. Switch 86 is connected to 0 bit write source 80 just before time VII, to discharge capacitor 100. A −15 volt write pulse is then applied to line 20 by connecting switch 72 to read, write and refresh circuit 50 at time VII. The gate electrode 42 of storage transistor 44 is discharged to ground potential. At time VIII the write operation is stopped with a zero bit now written into cell 10. Between times VIII and IX capacitor 100 is charged, prior to reading and refreshing. At times IX through X another read and refresh operation occurs. A −6 volts is placed on row line 20 from circuit 50 at time IX. Capacitor 100 remains charged when switch 86 is connected to line 94 since storage transistor 44 is nonconducting at time IX. Switch 86 is opened but capacitor 93 retains a charge in it. Amplifier 92 puts out a logic zero. When switch 83 is closed, line 84 goes from about −12 volts to zero volts since inverting amplifier 92 has −12 volts on its input 94. A logic zero is placed on line 84. When row line 20 is driven to −15 volts for refresh, gate electrode 42 remains uncharged. A 0 bit is thus read and refreshed in cell 10.

At time XI a store operation occurs during a power failure which is sensed by circuit 60. A read operation is done as described above with amplifier 92 constraining line 84 to the same state as gate 42. A highly negative voltage is then applied to row line 20 from store circuit 52, when switch 72 is connected thereto, in response to power supply sense circuit 60. Since no charge is on gate electrode 42 at this time the threshold voltage of write transistor 28 is changed from −2 volts to −10 volts, since the two insulator layers and channel region of write transistor 28 are not shielded and negative charge is driven out of the insulator layers of write transistor 28. The 0 bit of memory cell is nonvolatilely stored as a threshold voltage of −10 volts of write transistor 28. At time VII the store operation is stopped.

At time XIII a retrieve operation is started. A −7 volt intermediate gate voltage is applied through row line 20 to gate electrode 26. At the same time a 1 bit write voltage is applied to column line 84. Gate electrode 42 remains uncharged since write transistor 28 does not conduct due to the fact that its threshold voltage has been set at −10 volts, which is more negative than the −7 volt gate voltage on gate electrode 26. A 0 bit is therefore retrieved and volatilely stored in cell 10. If the threshold voltage of transistor 28 had been −2 volts during retrieval, a one bit would have been retrieved back into cell 10. At time XIV the retrieve operation is stopped.

At time XV an erase operation is preformed. A highly positive voltage is applied from erase circuit 56 via switch 72 to row line 20. The threshold voltage of write transistor 28 is raised back to −2 volts since negative charge is placed back into the insulator layers of write transistor 28. At time XVI the erase operation is stopped.

Figure 3:
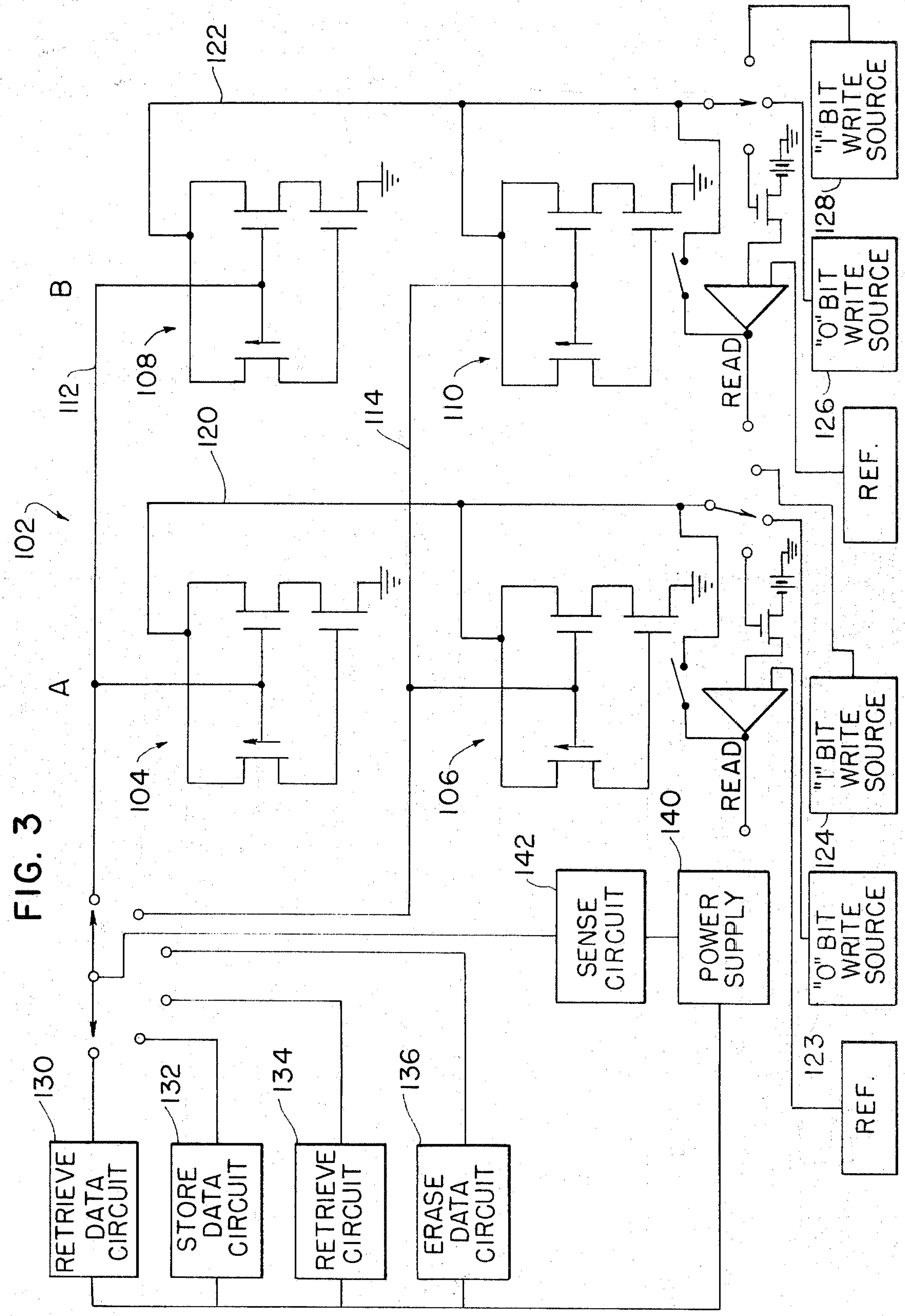
FIG. 3 is a schematic diagram of a memory circuit containing an array of nonvolatile random access memory cells.

In FIG. 3, an array 102 of four random access memory cells 104, 106, 108 and 110 is shown, each memory cell being identical to the random access memory cell 10 previously described with regard to FIG. 1. Row line 112 is connected to memory cells 102 and 108 and row line 114 is connected to memory cells 106 and 110. Column line 120 is connected to the memory cells 104 and 106 and column line 122 is connected to cells 108 and 110. A 0 bit write source 123 and a 1 bit write source 124 are provided for column A and another 0 bit write source 126 and 1 bit write source 128 is provided for column B. Read, write and refresh circuit 130 is used to read, write or refresh one row of array 102 at a given time. Store data circuit 132 is used to nonvolatilely store the information of a given row of the array 102. Retrieve circuit 134 is used to retrieve information nonvolatilely stored in a selected row of the array 102 of random access memory cells. Erase data circuit 136 is used to reset the threshold voltage of a alterable threshold field effect transistor of a selected row and column of the array 102 to its −2 volt state after data retrieval on power up. Power supply 140 is used to supply appropriate voltages to operate array 102 is conjunction with power supply sense circuit 142. Power supply sense circuit 142 senses any loss of power from power supply 140 and allows store data circuit to nonvolatilely store the information of the array 102 one row at a time.

Information may be written, read, refreshed, stored and retrieved in any random access memory cell of array 102 by selecting a column line 120 or 122 and a row line 112 or 114. The array 102 of FIG. 3 is operated in the same manner as described in the operation of the memory cell of FIG. 1.

The memory cells 102, 104, 106 and 108 may be integrated into a semiconductor wafer, such as a single silicon crystal. Two fixed threshold MOS (metal-oxide-semiconductor) transistors and one alterable threshold MNOS (metal-silicon nitride-silicon oxide-silicon) transistor are built into the silicon wafer by standard techniques known in the art to form each of these memory cells.

What is claimed is:

1. A nonvolatile random access memory cell, comprising:

an alterable threshold field effect write transistor having source, drain and insulated gate electrodes;

a fixed threshold field effect storage transistor having source, drain and insulated gate electrodes;

a fixed threshold field effect read transistor having source, drain and insulated gate electrodes;

the source electrode of the write transistor connected to the gate electrode of the storage transistor;

the source electrode of the read transistor connected to the drain electrode of the storage transistor;

the drain electrode of the write transistor connected to the drain electrode of the read transistor;

the gate electrode of the write transistor connected to the gate electrode of the read transistor; and the source electrode of the storage transistor connected to a chosen potential means.

2. The nonvolatile memory cell of claim 1 wherein the alterable threshold field effect write transistor has two insulator layers therein to store charge therebetween.

3. The nonvolatile memory cell of claim 1 wherein the alterable threshold field effect write transistor is an alterable threshold MNOS field effect write transistor.

4. The nonvolatile memory cell of claim 1 wherein the alterable threshold field effect write transistor is an alterable threshold MAOS field effect write transistor.

5. The nonvolatile memory cell of claim 1 further comprising a store circuit, and means for connecting the gate electrodes of the read and write transistors to the store circuit as power is removed from the nonvolatile memory cell to nonvolatilely store volatile binary information of the storage transistor into the write transistor.

6. The nonvolatile memory cell of claim 1 further comprising an erase circuit, and means for connecting the gate electrodes of the read and write transistors to the erase circuit while power is applied to said nonvolatile memory cell to erase information in the write transistor in anticipation of the nonvolatile storage of new binary information therein.

7. The nonvolatile memory cell of claim 1 further comprising a retrieve circuit, and means for connecting the gate electrodes of the read and write transistors to the retrieve circuit while power is applied to the nonvolatile memory cell to apply a retrieve gate voltage to said gate electrode of the write transistor to retrieve nonvolatilely stored binary information from the write transistor into the storage transistor.

8. The nonvolatile memory cell of claim 7 further comprising a differential amplifier, and means for connecting the drain electrodes of the read and write transistors to the differential amplifier to ssnse for the conduction of the storage transistor at a selected retrieve gate voltage on the gate electrode of the write transistor.

9. A plurality of nonvolatile random access memory cells as in claim 1 arranged in a nonvolatile random access memory array.

10. The nonvolatile random access memory array of claim 9 which is integrated into a semiconductor wafer.

11. The array of nonvolatile memory cells of claim 9 further comprising a store circuit, and means for connecting the store circuit to the gate electrodes of selected read and write transistors to the store circuit as power is removed from said array to nonvolatilely store volatile binary information of storage transistors connected to source electrodes of the selected write transistors into these selected write transistors.

12. The array of nonvolatile memory cells of claim 9 further comprising an erase circuit, and means for connecting the erase circuit to the gate electrodes of selected read and write transistors while power is applied to said array to erase information in the write transistors in anticipation of the nonvolatile storage of new binary information therein.

13. The array of nonvolatile memory cells of claim 9 further comprising a retrieve circuit, and means for connecting the gate electrodes of selected read and write transistors to the retrieve circuit while power is applied to said plurality of nonvolatile memory cells to apply a retrieve gate voltage to gate electrodes of the selected write transistors to retrieve nonvolatilely stored binary information from the selected write transistors onto the gate electrodes of storage transistors connected to the selected write transistors.

* * * * *